United States Patent [19]

Hlavac

[11] Patent Number: 5,160,102

[45] Date of Patent: Nov. 3, 1992

[54] CONTROLLER VALVE FOR DEICER

[75] Inventor: Kenneth A. Hlavac, Pearisburg, Va.

[73] Assignee: The B. F. Goodrich Company, Akron, Ohio

[21] Appl. No.: 783,650

[22] Filed: Oct. 28, 1991

[51] Int. Cl.$^5$ .............................................. B64D 15/00
[52] U.S. Cl. .............................. 244/134 A; 244/134 R; 137/625.64
[58] Field of Search ....................... 244/134 A, 134 R; 137/625.64, 625.6, 899.2

[56] References Cited

U.S. PATENT DOCUMENTS

| 2,770,308 | 11/1956 | Saurenman | 137/625.64 |
| 3,693,916 | 9/1972 | Tritt et al. | 244/134 A |
| 4,733,834 | 3/1988 | Phillips, II | 244/134 |
| 4,735,554 | 4/1988 | Phillips, II | 244/134 |
| 5,022,611 | 6/1991 | Weisend, Jr. et al. | 244/134 |
| 5,035,380 | 7/1991 | Weisand, Jr. et al. | 244/134 A |

FOREIGN PATENT DOCUMENTS 0173162  3/1986  European Pat. Off. ........ 244/134 A

Primary Examiner—Joseph F. Peters, Jr.
Assistant Examiner—Christopher P. Ellis
Attorney, Agent, or Firm—Joseph Januszkiewicz

[57] ABSTRACT

A system for controlling the inflation and deflation of deicer members for breaking up ice formation thereon. A non-regulated pressure source is connected to a controller valve and an ejector valve, wherein the ejector valve supplies a vacuum source to the controller valve as needed to keep the deicer members deflated. The controller valve is operative upon actuation to direct pressurized fluids to the inflatable deicer members and upon a predetermined build-up of pressure interrupts the flow of fluids from the pressure source while locking the inflatable deicer members in their inflated condition until the controller valve is de-actuated so it places the deicer units in communication with a vacuum.

11 Claims, 3 Drawing Sheets

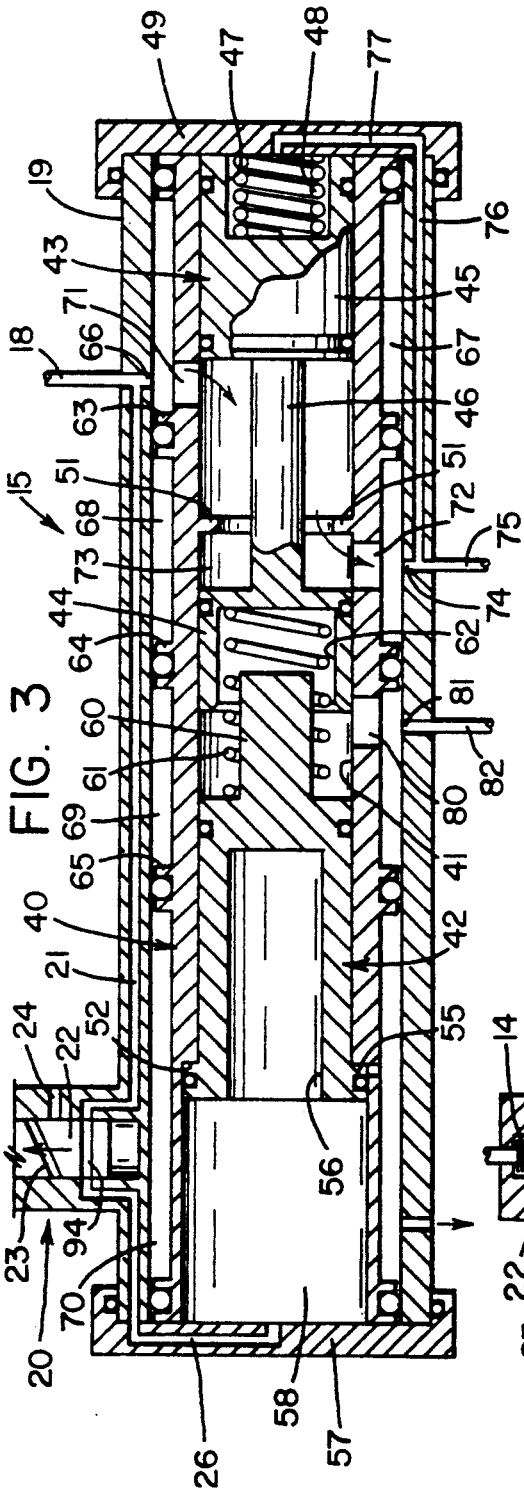
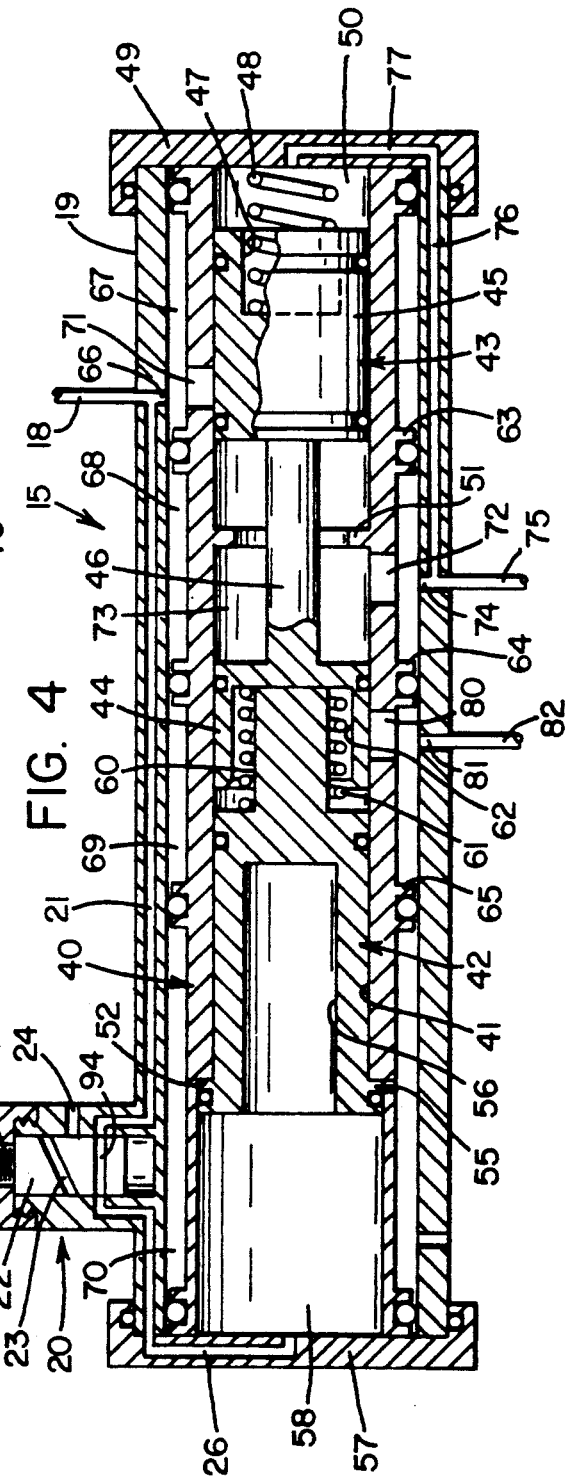

CONTROLLER VALVE FOR DEICER

BACKGROUND OF THE INVENTION

This invention relates to a control system for removing an ice film from an aircraft's wings and more particularly to using a control valve for inflation purposes using unregulated turbine bleed air in such system.

Under certain atmospheric conditions, ice is formed and accumulates on the leading edge of an aircraft wing or airfoils, which has the deleterious effect of adding unwanted weight to the aircraft and changing the shape of the airfoil to reduce lift and increase drag and turbulence. Accordingly, it is necessary to provide effective means to remove ice formations and its accumulation on the airfoils of airplanes.

The present invention provides a simplified control circuit with novel control valve means for the effective control of pneumatic deicer members in removing ice formation and accumulation from airfoils. The invention's unique control valve uses unregulated turbine bleed air for effectively and efficiently applying a vacuum and pressure to the deicer members without the need of a pressure regulator to prevent overpressurization thus reducing maintenance and also the weight of auxiliary equipment.

SUMMARY OF THE INVENTION

The invention is directed to a system for controlling the inflation of deicer members in response to a timer switch which utilizes a controller valve and an ejector valve, wherein the ejector valve receives a pressurized air which controls the vacuum to such controller valve and in turn to the deicer members. Such pressurized air source and vacuum are alternately supplied to the deicer members by a controller valve that in the operative condition supplies a vacuum to the deicer members and upon actuation directs pressurized air to the deicer members. The controller valve has a compensator that equalizes the pressure thereinto to lock the inflated deicer units in their inflated condition while simultaneously blocking further flow of the pressurized air source to the system. This causes very rapid inflation of de-icer members which efficiently removes ice accumulation from the aircraft leading edge and quickly blocks pressurized turbine bleed air when the de-icer members are sufficiently inflated to prevent overpressurization of such members.

BRIEF DESCRIPTION OF THE DRAWINGS

FIG. 3 is a side elevational view partly in cross of the controller valve with the valve shown in a condition for inflating the deicer members;

FIG. 4 is a side elevational view partly in cross section of the controller valve with the valve shown in a condition for holding the deicer members in an inflated condition.

DETAILED DESCRIPTION

Figure 1:
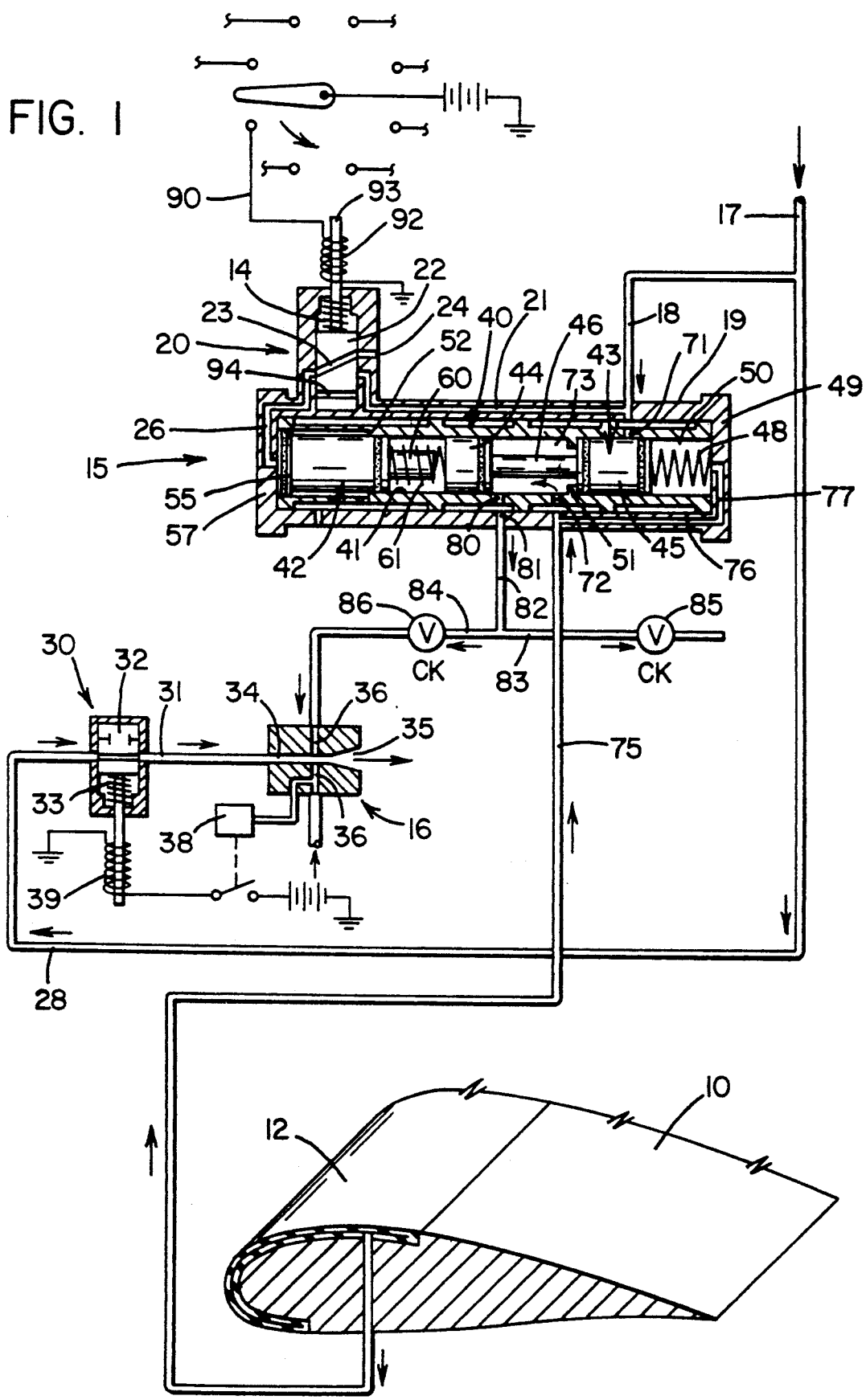
FIG. 1 is a diagrammatic view of a portion of an airplane's wing with a deicer member and the control circuit set for pulling a vacuum on the deicer members.

Referring to the drawings wherein like reference numerals designate like or corresponding parts throughout the several views, there is shown in FIG. 1 a portion of an airplane's wing 10 having a leading edge upon which is mounted a plurality of deicer members or inflatable members of which only a portion of one is shown as at 12. Inflatable member 12 comprises an extensible flexible and elastic structure of rubber or rubber-like material reinforced with fabric and may have inflatable tubes therein or are sewn to contain passageways which are distensible to break up the ice accumulated thereon.

The valve means for controlling the operation of the deicer members or inflatable members 12 includes a controller valve 15 and an ejector valve 16, both of which are connected to a conduit 17 which contains the pressurized fluids from the turbine bleed air.

A branch conduit 18 has one end connected to conduit 17 and has its other end connected to an outer cylindrical housing 19 of controller valve 15. Such branch conduit 18 is connected to a solenoid operated valve 20 via a passageway 21, which passageway 21 extends through the wall of outer cylindrical housing 19. Solenoid operated valve 20 is mounted on the outer cylindrical housing 19 and is an integral part of the controller valve 15 to reduce weight of the deicer control system. The outer cylindrical housing 19 may have a boss thereon to facilitate the mounting of such valve 20 thereon. In the normal position, solenoid operated valve 20 is biased by spring 14 such that its moveable spool designated 22 in FIG. 1 is blocked from interconnecting conduit 18 and passageway 21, with a passageway 26, which passageway 26 is connected to the one end of controller valve 15. Such passageway 26 is vented or exhausted to atmosphere through a passageway 23 in spool 22 and a port 24 in the wall of solenoid operated valve 20 in the normal condition of such valve 20.

A second branch conduit 28 interconnects conduit 17 to a solenoid operated valve 30 which in turn has a conduit 31 interconnecting such valve 30 to ejector valve 16. In the normal non-actuated condition of solenoid valve 30, a moveable spool 32 therein is biased by a spring 33 to interconnect pressurized conduit 28 with conduit 31 to direct high pressurized fluids to the inlet of ejector valve 16. Ejector valve 16, shown schematically in FIG. 1, has a central passageway 34 which directs the pressurized fluids therethrough for discharge to atmosphere via exhaust opening 35. A plurality of narrow passageways 36 within the housing of ejector valve 16 are connected to the central passageway 34. As the stream of high pressurized air passes through the central passageway 34, a vacuum is drawn or pulled from the plural narrow passageways 36. Activation of solenoid operated valve 30 is effected by a vacuum switch 38, old and well-known in the art, located within one of the passageways in ejector valve 16 which energizes coil 39 to move spool 32 downward as seen in FIG. 1 to block the flow of pressurized fluids to the ejector valve 16 to conserve the high pressure bleed air. The respective narrow passageways 36 may each be connected to separate controller valves 15, however, for purposes of explanation, only one controller valve 15 will be discussed, since the operation would be the same for each.

Figure 2:
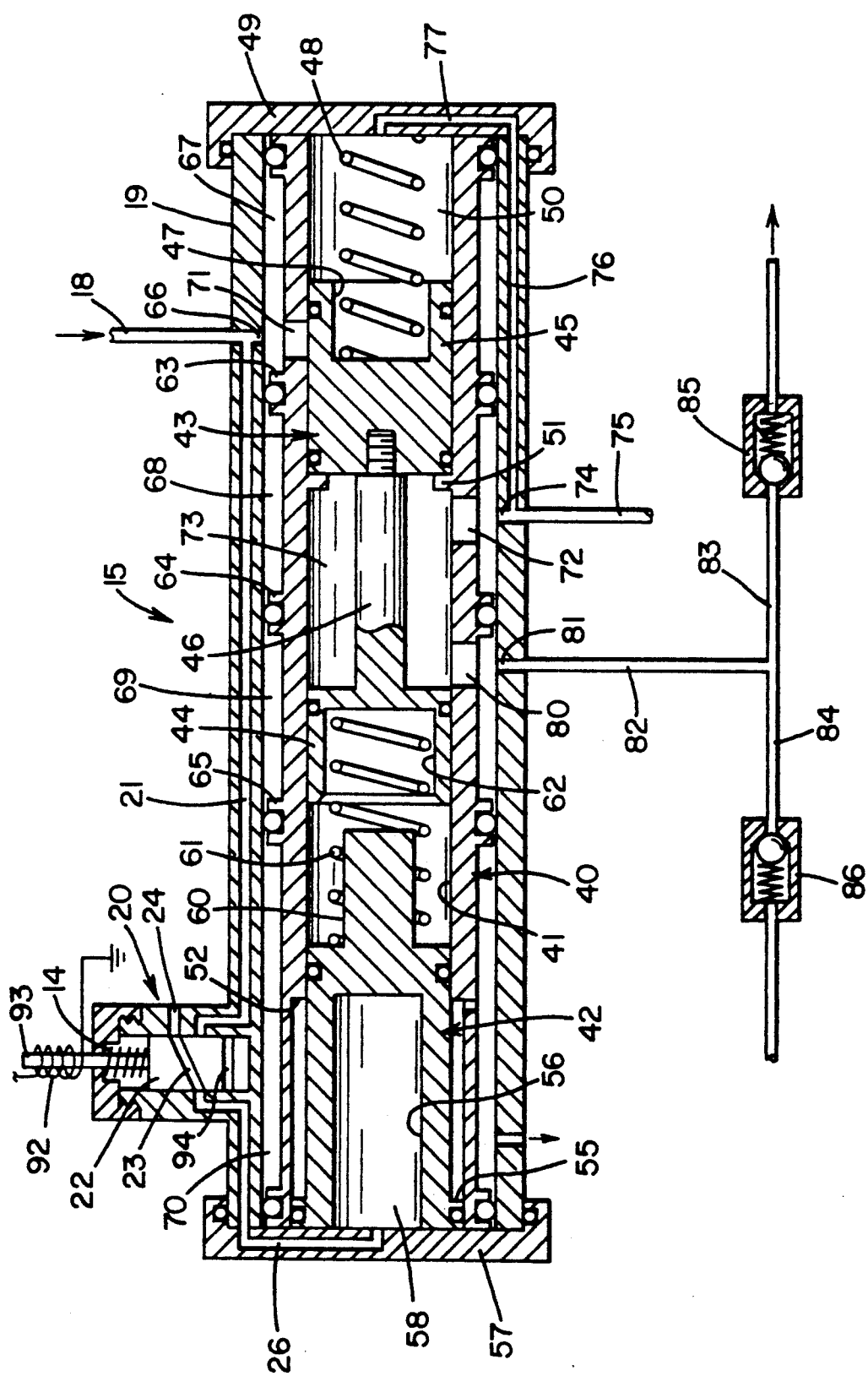
FIG. 2 is an enlarged side elevational view partly in cross section of a controller valve as shown in FIG. 1.

Controller valve 15 has an inner cylindrical housing 40 with a central bore 41 extending longitudinally therethrough, which bore 41 supports a pair of axially spaced movable spools or spool members 42 and 43 slidably mounted therein. Spool 43 has a pair of spaced lands 44 and 45 separated by a reduced diameter portion 46. The one end of land 45 is recessed to define a recess 47 which receives a spring 48, which spring 48 biases the spool 43 to the left as viewed in FIG. 2. As seen in FIG. 2, the inner cylindrical housing 40 is encapsulated by the outer cylindrical housing 19 to form a narrow annular chamber therebetween. An end cap 49 is suitably secured to the one end portion of inner cylindrical housing 40 and outer cylindrical housing 19 to cooperate with the recess 47 to define a chamber 50. The bore 41 has a pair of axially spaced annular shoulders 51 and 52. Shoulder 51 limits the movement of spool 43 by the action of spring 48. Spool 42 has an annular shoulder 55 on its outer end portion that is operative to engage the annular shoulder 52 in bore 41. The one end of spool 42 has a recess 56 that cooperates with an end cap 57 to define a chamber 58 that communicates with passageway 26 in end cap 57. The other end of spool 42 has a reduced portion 60 that is encompassed by a spring 61 which has its one end seated into a recess 62 of land 44 of spool 43. Spring 61 normally biases spool 42 into abutting engagement with end cap 57. The inner cylindrical housing 40 has a plurality of axially spaced annular abutments 63-64-65 on its outer peripheral surface which receives 0-rings that cooperate with the inner wall surface of outer cylindrical housing 19 to define a plurality of axially spaced annular chambers 67-68-69-70 respectively. Inner cylindrical housing 40 has a plurality of circumferentially spaced bores 71 closely adjacent annular abutment 63 for interconnecting annular chamber 67 with bore 41. In the normal condition of land 43 (as shown in FIG. 2), land 43 blocks chamber 67 from making communication with central bore 41 since land 43 covers plural ports or bores 71. Conduit 18 communicates with chamber 67 via port 66 to maintain such chamber pressurized to the extent that the turbine bleed air permits. In effect annular chamber 67 acts as a reservoir or an accumulator to provide means to institute a faster reaction time to inflate the deicers. Inner cylindrical housing 40 has a plurality of circumferentially spaced ports or bores 72 located between annular abutments 63 and 64 for interconnecting annular chamber 68 with a chamber 73 defined by the space between lands 44-45, the reduced diameter portion 46 of spool 43 and the inner wall surface of inner cylindrical housing 40. In normal condition of the spools 42 and 43 (as shown in FIG. 2) annular chamber 68 communicates directly with chamber 73 via plural ports 72. Annular chamber 68 is connected via an external port 74 in the external cylindrical housing 19 via a conduit 75 to the inflatable members 12 of the deicer pad. Annular chamber 68 is also connected via a passageway 76 in the wall of external cylindrical housing 19 and passageway 77 in end cap 49 with chamber 50 which is between the one end portion of inner cylindrical housing 40, the end cap 49 and the recess 47 in land 45 for a purpose to be described.

Inner cylindrical housing 40 has a plurality of circumferentially spaced ports or bores 80 located between the annular abutments 64 and 65 for interconnecting annular chamber 69 with chamber 73 as seen in FIG. 2. In this condition of the controller valve 15, both chambers 68 and 69 are interconnected to each other via chamber 73 to thereby be at the same pressure. Annular chamber 69 is connected via a port or bore 81 to a conduit 82 which has two branch conduits 83 and 84. Branch conduit 83 is connected to exhaust or atmosphere via a one-way check valve 85. Branch conduit 84 is connected via one-way check valve 86 to one of the passageways 36 in the ejector valve 16.

To control the energization and de-energization of the solenoid operated valve 20 and its solenoid, a suitable timer, upon actuation by an operator, will make contact at the pre-set time intervals with an electric line 90 which will energize coil 92 of solenoid valve 20 to move spool 22 upward as viewed in FIG. 1. A diagrammatic showing of a timer for multiple deicer pads is shown in FIG. 1. Such figure depicts a central timing mechanism that has plural taps that control several cores of solenoid valves that can in turn be operated in timed relation to control several deicer members, with each deicer member having a connection to one of the passageways 36 in the ejector valve 16. The length or intervals can be controlled as desired in a manner old and well-known in the art.

Assuming that the control circuit is off, a continuous pressurized volume of air, which is bled off from the turbine, is directed into conduit 17, thence via branch conduit 28 through the normally open solenoid valve 30 to conduit 31 into passageway 34 of ejector 16. As the pressurized air passes through passageway 34 and out through the exhaust opening 35, a vacuum is drawn in the passageway 36 and thence via check valve 86 and conduit 82 draws a vacuum in chamber 69 and thence via bores 72 draws a vacuum in chamber 73 defined by the cylinder 40 and the reduced spool portion of spool 43. In this condition of spools 42 and 43, chamber 73 is also connected to chamber 50 via bore 72, chamber 68 and passageway 76 to thus make spring 48, the sole means for controlling the position of spool 43. The vacuum in chambers 73 and 68 is also connected via conduit 75 to the deicer pads such as to keep them deflated.

Upon actuation of the timer switch by an operator, the timer switch will, upon the preset time, send an electrical current via line 90 to energize coil 92 which then pulls a plunger 93 of solenoid valve 20 upwardly to permit the flow of pressurized air from conduit 17 to branch conduits 18 and thence via passageway 21 through passageway 94 in spool 22 through passageway 26 into chamber 58 of spool 42 which then moves such spool rightwardly as viewed in FIG. 2 to compress spring 61, which in turn moves the spool 43 rightwardly as viewed in FIG. 2 to compress spring 48 into recess 47. Such movement of spool 43 moves the land portion 45 to uncover port 71 and place such port in communication with port 72, which port 72 is in communication via conduit 75 to the deicer pads. Port 71 is in communication with the pressurized air of conduit 17 and the reservoir of pressurized air in chamber 67, which thus directs the pressurized air to the deicer pads to rapidly inflate the inflatable tubes in such deicer members 12 and thus place the deicers into a position to break the ice accumulated thereon. Spool 43 also moves to close off port 80, which occurs before opening port 71. Before the timer interrupts the inflation cycle, the pressurized air continues to flow via passageway 76 to chamber 50 in the one end of spool 43. As the pressure in chamber 50 increases the force of spring 61 is offset until spool valve 43 moves leftwardly as seen in FIG. 2 until it contacts spool 42 at protrusion or reduced end portion 60 to isolate conduit 18 and pressurized chamber 67 by closing off port 71 and thus conserve on the flow of pressurized fluids as well as preventing overinflation of the deicer members while simultaneously maintaining the pressure in the distended tubes of the deicers 12. Port 80 also remains closed off.

When the timer interrupts the current flow to coil 82 of solenoid valve 20, the spool 22 of solenoid operated valve 20 will return to the position shown in FIG. 1 and 2 thereby venting the pressurized air from the chamber 58 to atmosphere which allows spool 42 to return to its normal position by the action of bias from spring 61 as shown in FIG. 4. This in turn creates an off-balance situation for spool 43, which causes spool 43 to shift left, which interconnects ports 80 and 72 to thereby connect the deicer pads via conduits 75 and 82 to exhaust to atmosphere. The majority of the pressurized air is exhausted to atmosphere through the check valve 85. This allows for rapid deflation while not adversely affecting the vacuum supplied to the remaining deicers through the ejector. When the deicer pressure of deicer members 12 is near atmospheric, check valve 85 closes. Also during the deflation cycle, some air exhausts through the ejector 16 via branch conduit 84 and passageway 36. This is only a very small amount such that vacuum can be maintained at all passageways 36. When check valve 85 closes, the remaining pressure is evacuated through the ejector 16 until the deicer members 12 reach the required vacuum level. This action is further facilitated by the movement of the pressurized air via check valve 86 into ejector valve 16, such that the vacuum switch 38 senses a lack of vacuum and actuates solenoid operated valve 30 into a condition as shown in FIG. 1 to allow the pressurized air to flow through such valve 30 to flow through passageway 34 and pull a vacuum through check valve 86 to help exhaust the pressurized air from the deicer pads 12, thus facilitating the rapid response of deflation as well as preventing automatic inflation during normal flight operation.

Various modifications are contemplated and may obviously be resorted to by those skilled in the art without departing from the described invention as hereinafter defined by the appended claims, as only a preferred embodiment thereof has been disclosed.

What is claimed is:

1. A controller valve for regulating the inflation and deflation of inflatable members of a pneumatic deicer, said controller valve having an inner housing with a longitudinally extending bore, an end cap on each end of said inner housing to cooperate with said bore to define a closed chamber, an annular abutment in said closed chamber, said inner housing having an inlet port and a pair of outlet ports communicating with said bore, said inlet port operatively connected to a pressurized source of fluids, one of said outlet ports operatively connected to said inflatable members, the other one of said outlet ports connected to a vacuum line, a pair of axially spaced spool valves movably located in said bore, first spring means located between said spool valves operative to bias said spool valves away from each other into their first respective positions wherein one of said spool valves blocks said inlet port while interconnecting said pair of outlet ports, each of said spool valves having a recess on their respective ends that cooperates with said end caps to define a first chamber and a second chamber, a second spring means located in said first chamber and operatively engaging said one spool valve to maintain said one spool valve in said first position, passageway means interconnecting said first chamber to said one outlet port operative for equalizing the pressure in said first chamber to the pressure in said inflatable member, and a solenoid operated valve operative upon actuation to direct pressurized fluid to said second chamber to move said spool valves into a second position to direct pressurized fluid from said inlet port to said one outlet port while blocking said other one of said outlet ports thereby inflating said inflatable members.

2. A controller valve as set forth in claim 1 wherein said first chamber is operative upon equalization of pressure to said pressure of said inlet port to move solely said one spool valve to a position to close said inlet port and hold said inflatable members in an inflated condition.

3. A controller valve as set forth in claim 1 wherein said one spool valve is limited in its movement toward said other valve by an annular abutment in said closed chamber.

4. A controller valve as set forth in claim 2 wherein said vacuum line is connected to an ejector valve, a conduit means interconnecting said pressure source via a solenoid valve to said ejector valve, and a vacuum sensor in said ejector valve operative upon sensing a predetermined vacuum level therein for actuating said solenoid valve to block the flow of pressurized fluid to said ejector valve.

5. A non-regulated fluid deicer control system having a housing with a central bore extending therethrough, said bore having a pair of axially spaced spool valves movably mounted therein, an end cap mounted on each end portion of said housing, one end cap cooperative with one of said spool valves to define a first chamber, the other one of said end caps cooperates with the other one of said spool valves to define a second chamber, an annular abutment located in said bore, a spring located in said first chamber to position said one spool valve into its first position and into engagement with said annular abutment, a second spring mounted in said bore between said axially spaced spool valves to position said other spool valve into a first position, said one spool valve having a groove that cooperates with said bore of said housing to define a third chamber, said housing having a pair of outlet ports and an inlet port communicating with said bore, said inlet port connected to an unregulated fluid pressure source, said groove of said one spool communicates said pair of outlet ports in said housing when said one spool valve is in its first position, one of said outlet ports has a vacuum source connected thereto, the other one of said outlet ports communicates with a conduit that is connected to an inflatable deicer member for drawing a vacuum therefrom when said one spool valve is in its first position, said conduit having a branch conduit interconnecting said first chamber with said other one of said outlet ports to equalize the pressures therebetween, said other spool valve operative upon actuation for movement into a second position, said other valve in said second position operative to move via said second spring to move said one spool valve into a second position to thereby interconnect said inlet port to said other one of said outlet ports and to said conduit to direct pressurized air to said inflatable deicer members, and said outlet ports blocked from their inter-communication when said one spool valve is in its second position.

6. A non-regulated fluid deicer control system as set forth in claim 5 wherein said inlet port communicates with said pressure source via a fluid reservoir that is pressurized at all times to the maximum pressure of said pressure source, and said fluid reservoir communicates with said bore by a plurality of circumferentially spaced bores to provide a dumping of pressurized fluid thereinto when said one spool valve is moved into said second position.

7. A non-regulated fluid deicer control system as set forth in claim 5 wherein said first chamber is operative upon equalization of pressure to the pressure of said inlet port to move solely said one spool valve to a third position which blocks said inlet port and said one outlet port and holds said inflatable members in an inflated condition.

8. A non-regulated fluid deicer control system as set forth in claim 7 wherein said a second annular abutment is located in said bore, and said other spool valve is moved into abutting contact with said second annular abutment upon actuation to limit its axial movement in said bore toward said one spool valve.

9. A deicer control system for regulating the inflation and deflation of inflatable members of a pneumatic deicer, a controller valve and a vacuum valve, said vacuum valve operative to supply a vacuum to said controller valve via connector means, said controller valve having a central chamber connected at all times via conduit means to said inflatable member, said controller valve having a pressure equalization chamber connected via passageway means to said central chamber and said conduit means, said controller valve operative in a non-actuated condition to connect said connector means to said conduit to draw a vacuum on said inflatable members and place said inflatable members in a deactuated state, a pressurized air source of unregulated pressure connected to said controller valve, said control valve operative immediately upon actuation to connect said pressurized air source to said conduit means to inflate said inflatable members while directing pressurized air to said equalization chamber, and said controller valve operative upon equalization of pressure between said central chamber and said equalization chamber to isolate said pressurized inflatable members while simultaneously interrupting the flow of said pressurized air from said pressurized air source to said controller valve.

10. A controller valve for regulating the inflation and deflation of inflatable members of a pneumatic deicer; said controller valve having a cylindrical member with a longitudinally extending central bore; a housing encompassing said cylindrical member providing an annular clearance space therebetween; an end cap on each end of said housing to abut each end of said housing and said cylindrical member to define said annular clearance space as a chamber and said central bore as a central chamber; three axially spaced annular abutments are located in said annular clearance space to define a first annular chamber, a second annular chamber and a third annular chamber; said first annular chamber is operatively connected to a pressure source of fluids for maintaining a pressure therein; said second annular chamber having a first port for connection via a conduit to said inflatable members and via a passageway means to one end of said central chamber defining an equalization chamber; said third annular chamber connected via a port and a conduit means to exhaust via a one way check valve and via a one way check valve to a vacuum source to maintain a vacuum in said third annular chamber; said cylindrical member having a first set of a plurality of circumferentially spaced ports interconnecting said first annular chamber with said central bore; said cylindrical member having a second set of a plurality of circumferentially spaced ports interconnecting said second annular chamber with said central bore; a third set of a plurality of circumferentially spaced ports interconnecting said third annular chamber with said central bore; a pair of spools movably mounted in said central bore; and a solenoid operated valve integral with said housing and operative to position said spools to selectively inflate said inflatable members and deflate said inflatable members by pulling a vacuum thereon.

11. A controller valve as set forth in claim 10 wherein a first spring means located between said spools operative to bias said spools away from each other into their first operative positions wherein one of said spools blocks said first set of ports while interconnecting said second and third set of ports to thereby draw a vacuum on said inflatable members, a second spring means located in said equalization chamber and operatively engaging said one spool to maintain said one spool in said first position, and said solenoid operated valve having an outlet means connected to the other end of said central chamber for cooperation with the other one of said spools to define a solenoid operated pressure chamber, said solenoid operated valve operative upon actuation to direct pressurized fluid to said solenoid operated pressure chamber to move said spools into a second position to direct pressurized fluid from said first annular chamber to said second annular chamber thereby inflating said inflatable members and sending pressurized fluid to said equalization chamber.

* * * * *